United States Patent Office 3,328,346
Patented June 27, 1967

3,328,346
METHYLPHENYL POLYSILOXANES
Christian R. Sporck, Burnt Hills, N.Y., assignor to General Electric Company, a corporation of New York
No Drawing. Filed Dec. 18, 1961, Ser. No. 160,270
2 Claims. (Cl. 260—46.5)

This invention relates to cyclic organopolysiloxanes in which the organo groups are methyl radicals and phenyl radicals and to polymers prepared therefrom.

Heretofore a number of cyclic organopolysiloxanes have been known in the art including the cyclic trimer and cyclic tetramer consisting of either dimethylsiloxane units or diphenylsiloxane units. In addition, polymers of each of these cyclic materials have been known as well as copolymers prepared by reacting these two cyclics together in the presence of an organopolysiloxane rearrangement and condensation catalyst. Thus, linear polydiorganosiloxanes have been prepared by the rearrangement and condensation of a mixture of octamethylcyclotetrasiloxane and octaphenylcyclotetrasiloxane in the presence of a suitable catalyst such as potassium hydroxide.

While methylphenylpolysiloxanes of the type described above have been prepared, these materials have been very random in nature because of the fact that during the rearrangement and condensation it has been impossible to control the relative positions of the polysiloxane portions resulting from the respective cyclic materials. For example, in the rearrangement and condensation of a mixture of octamethylcyclotetrasiloxane and octaphenyl-cyclotetrasiloxane, because of differences in reactivity of the two materials, a plurality of octaphenyltetra siloxane units are found adjacent to each other and a plurality of octamethyltetrasiloxane units are found together rather than finding these groups alternating in the linear chain. In a number of applications it is desirable to provide organopolysiloxanes which contain the contribution of both phenyl groups for thermal stability and irradiation resistance, and methyl groups for flexibility and elasticity at low temperatures. It is also desirable that the characteristics introduced into the organopolysiloxanes by these groups be regularly distributed along the siloxane chain rather than being found in random portions of the chain.

It is an object of the present invention to provide novel cyclopolysiloxanes containing both silicon-bonded methyl and silicon-bonded phenyl groups which can be polymerized to form linear polydiorganosiloxanes in which the ratio of methyl groups to phenyl groups can be controlled, in which the methyl and phenyl groups appear in regular order in the chain and in which a high proportion of phenyl groups can be incorporated into high molecular weight polymers, i.e., polymers having minimum molecular weights in the range of from about 10,000 to 100,000 or more.

This and other objects of my invention are provided by cyclic polydiorganosiloxanes having the formula:

(1)
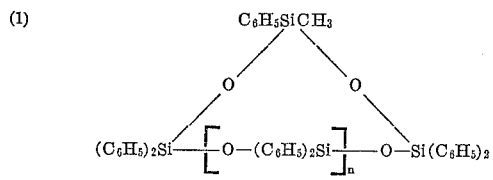

where $n$ is a whole number equal to from 0 to 1, inclusive. The cyclopolysiloxanes of formula (1) can be polymerized to provide linear polydiorganosiloxanes consisting essentially of the recurring unit:

(2)
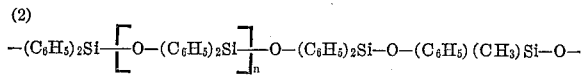

where $n$ is as previously defined. In addition, the cyclic polydiorganosiloxanes of Formula 1 can be copolymerized with other cyclic polydiorganosiloxanes to form a number of copolymers. As is apparent from Formula 1, two cyclic polydiorganosiloxanes are encompassed within the scope of the present invention. These materials are methylpentaphenylcyclotrisiloxane and methylheptaphenylcyclotetrasiloxane.

The cyclopolysiloxanes within the scope of Formula 1 are prepared by effecting reaction between an hydroxy chain-stopped polydiphenylsiloxane having the formula:

(3)
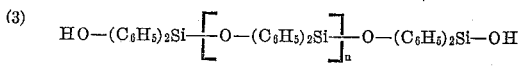

where $n$ is as previously defined, and a methylphenyldihalogenosilane having the formula:

(4) $(CH_3)(C_6H_5)SiX_2$ where X is halogen, e.g., chlorine, bromine, etc., and preferably chlorine. It is apparent that Formula 3 encompasses two compounds, namely, tetraphenyldisiloxanediol-1,3 and hexaphenyltrisiloxanediol-1,5.

The reaction to form the cyclic polydiorganosiloxane of Formula 1 theoretically involves one mole of the hydroxyl chain-stopped material of Formula 3 and one mole of the dihalogenosilane of Formula 4 and results in the formation of two moles of hydrogen halide. To facilitate the reaction, a halogen halide acceptor is employed. Suitable hydrogen halide acceptors are any organic tertiary amine, e.g., pyridine, triethyl amine, N,N-dimethyl aniline, etc. In theory, one mole of the hydrogen halide acceptor is required for each mole of hydrogen halide generated. While the theoretical ratio of reactants has been described above, the ratio of these ingredients can vary within wide limits. For example, the hydroxyl chain-stopped polydiphenylsiloxane of Formula 3 can be employed in an amount equal to from about 0.5 to 2 moles per mole of the methylphenyldihalogenosilane of Formula 4. Preferably, the hydrogen halide acceptor is employed in excess, with there being from about 3 to 30 moles of hydrogen halide acceptor per mole of whichever of the other two reactants is present in the smaller amount. Preferably, the hydroxy chain-stopped material of Formula 3 and the dihalogenosilane of Formula 4 are employed in equimolar amounts to reduce the formation of by-products and to simplify the purification of the desired cyclopolysiloxane since no significant amount of unreacted starting materials are left in the reaction mixture.

Because the hydroxyl chain-stopped polydiphenylsiloxanes of Formula 3 and the cyclic polydiorganosiloxanes of Formula 1 are solid materials at room temperature, it is preferable to effect the reaction in the presence of a solvent which is inert to the reactants under the conditions of the reaction and which is a solvent for all reactants and reaction products except the hydrohalide of the hydrogen halide acceptor. Suitable solvents include tetrahydrofuran, tetrahydropyran, n-hexane, xylene, diethyl ether and toluene. In general, the solvent is employed in the ratio of 1 to 50 parts by weight based on the total weight of the other components of the reaction mixture.

Because the reaction to form the cyclic polydiorganosiloxane of Formula 1 proceeds at a satisfactory rate at room temperature, it is preferred to conduct the reaction at such temperature, i.e., a temperature of from about 15 to 25° C. However, it should be understood that the use of elevated temperatures, e.g., temperatures of from about 25 to 120° C. is not precluded. Depending upon the proportions of ingredients, the reaction temperature and the particular solvent employed, the time required for effecting reaction between the hydroxyl chain-stopped polydiphenylsiloxane of Formula 3 and the methylphenyldihalogenosilane of Formula 4 can vary from about 1 hour to 24 hours or more.

After the reaction is completed, the reaction mixture consists of a solution of the cyclic polydiorganosiloxane of Formula 1 together with any unreacted starting materials and a hydrohalide precipitate. This precipitate is filtered from the reaction mixture and the resulting filtrate is stripped of solvent and volatile starting materials, resulting in a crude product. The crude product is recrystallized from a suitable solvent such as benzene, hexane, ethanol, n-butanol, cyclohexane, or mixtures thereof to produce the purified cyclopolysiloxanes of Formula 1.

Polymeric materials consisting essentially of the recurring unit of Formula 2 can be formed by the polymerization of the cyclic polydiorganosiloxanes of Formula 1 by several methods. For example, the cyclopolysiloxanes can be polymerized by heat alone, by maintaining the cyclopolysiloxane at a temperature of about 250 to 350° C., preferably in an inert atmosphere such as nitrogen or a noble gas, for about 15 minutes to one hour during which time one of the siloxane bonds of the cyclopolysiloxane opens up and permits a conventional rearrangement and condensation to form a polymeric material which is a tough transparent gum soluble in benzene and toluene. This polymer gum can contain from about 20 to 10,000 or more and preferably from about 200 to 10,000 or more of the units of Formula 2 depending upon the reaction temperature and time. In general, these gums have an intrinsic viscosity of the order of from about 0.25 to 4.0 deciliters per gram and have a molecular weight of the order of from about 10,000 to 5,000,000 or more.

Another and preferred method of forming the polymers of the present invention is by the catalytic rearrangement and condensation of the cyclic polydiorganosiloxanes of Formula 1. This rearrangement and condensation is effected in the presence of a typical alkaline organopolysiloxane rearrangement and condensation catalyst such as potassium hydroxide. The rearrangement and condensation catalyst is conventionally added to the cyclopolysiloxane as a solution in octamethylcyclotetrasiloxane, for example, as a solution containing from about 0.1 to 1% by weight potassium hydroxide. In general, the amount of potassium hydroxide added is sufficient to provide about 10 to 100 parts by weight potassium hydroxide per million parts by weight of the cyclopolysiloxane. The catalytic polymerization is effected by heating the mixture of potassium hydroxide and the cyclopolysiloxane at a temperature above the melting point of the cyclic polydiorganosiloxane so as to insure thorough mixing of the catalyst with the cyclic material. In general, the polymerization is effected at a temperature of from about 110 to 170° C. with polymerization being completed in a time of from a few seconds up to 1 hour or more. The gums resulting from this base catalyzed polymerization are identical to those produced by the thermal polymerization previously described.

In addition to forming polymers of the cyclic polydiorganosiloxanes of Formula 1 alone, copolymers can be prepared by reacting the cyclopolysiloxanes of Formula 1 with other cyclic polydiorganosiloxanes. Preferably, in preparing these copolymers, the base catalyzed rearrangement and condensation reaction described above is employed.

Suitable cyclic polydiorganosiloxanes for copolymerization with the cyclic polydiorganosiloxanes of Formula 1 include, for example, hexaphenylcyclotrisiloxane, hexamethylcyclotrisiloxane, octaphenylcyclotetrasiloxane, or octamethylcyclotetrasiloxane; 1,1-dimethyl-3,3,5,5-tetraphenylcyclotrisiloxane which is described and claimed in my copending application Ser. No. 160,264, now abandoned, 1,1-dimethyl-3,3,5,5,7,7-hexaphenylcyclotetrasiloxane which is described and claimed in the copending application of Howard A. Vaughn, Jr., Ser. No. 160,267, now abandoned; triphenylsiloxy pentaphenylcyclotrisiloxane or triphenylsiloxy heptaphenylcyclotetrasiloxane which are described and claimed in my copending application Ser. No. 160,263; 1,1-bis-(p-chlorophenyl)-3,3,5,5-tetraphenylcyclotrisiloxane or p-chlorophenylheptaphenylcyclotetrasiloxane which are described and claimed in my copending application, Ser. No. 160,265; 1-methyl-1-(beta-cyanoethyl)-3,3,5,5-tetraphenylcyclotrisiloxane or gamma-cyanopropylheptaphenylcyclotetrasiloxane which are described and claimed in my copending application Ser. No. 160,271; compounds such as 1,1-bis-(trifluoromethylphenyl)-3,3,5,5-tetraphenylcyclotrisiloxane which are described and claimed in my copending application Ser. No. 160,272; cyclic materials containing both siloxane linkages and silphenylene linkages such as are described and claimed in my copending application Ser. No. 160,262; vinylpentaphenylcyclotrisiloxane or vinylheptaphenylcyclotetrasiloxane which are described and claimed in my copending application Ser. No. 160,268; and 1-methyl-1-vinyl-3,3,5,5-tetraphenylcyclotrisiloxane or 1-methyl-1-vinyl-3,3,5,5,7,7-hexaphenylcyclotetrasiloxane which are described and claimed in my copending application Ser. No. 160,269. All of the aforementioned copending applications are filed concurrently herewith and assigned to the same assignee as the present invention.

The copolymerization of the cyclic polydiorganosiloxanes of Formula 1 with the aforementioned other cyclic polydiorganosiloxanes results in high molecular weight polysiloxane gums which are tough, clear materials and which are soluble in solvents such as benzene and toluene. When copolymeric organopolysiloxanes are prepared by copolymerizing the cyclopolysixoxanes of Formula 1 with other cyclopolysiloxanes, the procedure employed is identical to that employed in preparing the polymers within the scope of Formula 2. The ratio of the various cyclopolysiloxanes used in the preparation of the linear copolymers can vary without limit, depending upon the characteristics desired in the final copolymeric material. Satisfactory cyclopolysiloxane mixtures can contain from 1.0 to 99 percent by weight of the cyclopolysiloxanes of Formula 1 based on the total weight of cyclopolysiloxanes in the mixture.

All of the polymers consisting of the repeating units of Formula 2 as well as all of the copolymers containing the repeating unit of Formula 2 together with other polydiorganosiloxane units can be cross-linked by high doses of ionizing radiation such as irradiation doses of about $100 \times 10^6$ to $1000 \times 10^6$ Roentgens. Preferably, this irradiation is provided by high energy electron bombardment as described and claimed in Patent 2,763,609—Lawton et al., employing electrons having energies of from about 50,000 to 20,000,000 electron volts.

Because of the high phenyl content of the polymers consisting of the repeating units of Formula 2 it is not feasible to effect cross-linking with conventional free-radical catalysts. However, many of the copolymers prepared from cyclopolysiloxanes of Formula 1 with other cyclopolysiloxanes can be cross-linked by chemical catalysts. This is true with respect to copolymers which contain at least one silicon-bonded vinyl group per one hundred silicon atoms or which contain at least one pair of adjacent methyl-containing silicon atoms per one hundred silicon atoms. Suitable chemical cross linking agents are the conventional organoperoxides such as benzoyl peroxide, dichlorobenzoyl peroxide, di-alpha-cumyl peroxide, tertiary butyl perbenzoate, etc., as well as other free-radical catalysts such as zirconyl nitrate and many diazo compounds. These cross-linking agents are used in an amount equal to from about 1.0 to 10 percent by weight, based on the weight of the copolymers. Cross-linking is effected by heating the catalyzed copolymer at a temperature of from about 100 to 125° C. for 10 to 20 minutes, followed by a post-cure at 150 to 225° C. for one to twenty-four hours.

The cross-linking of the polymers and copolymers described above results in the formation of silicone rubber. The cross-linking can be effected in either the presence or absence of filler materials to produce such silicone rubber. Among the many fillers which can be employed during the cross-linking of the polymers and copolymers described above are the various silica fillers such as silica aerogel, fumed silica and precipitated silica, as well as other types of fillers such as titanium dioxide, calcium silicate, ferric oxide, chromic oxide, cadmium sulfide, asbestos, glass fibers, calcium carbonate, carbon black, lithopone, talc, etc. Preferably, the filler employed in preparing the silicone rubber is a finely divided silica filler. The percentage of filler in the silicon rubber can vary within extremely wide limits. In general, however, the fillers are employed in the ratio of from about 20 to 300 parts by weight filler per 100 parts by weight of the homopolymer or copolymer.

The silicone rubber described above is useful in all of those applications where conventional silicone rubber is useful and is particularly useful in applications where resistance to irradiation is required, where flexibility over an extremely wide temperature range is required and where an exceptionally high degree of thermal stability is required. For example, these materials are satisfactory for use as gaskets for automotive transmissions, as oven door seals, and as insulation for electrical conductors.

The folowing examples are illustrative of the practice of my invention and are not intended for purposes of limitation. All parts are by weight.

EXAMPLE 1

To a solution of 9.6 parts of methylphenyldichlorosilane and 15 parts pyridine in 210 parts diethyl ether was added a solution of 20.7 parts of tertaphenyldisiloxanediol-1,3 in 70 parts diethyl ether. The resulting solution was stirred vigorously and allowed to stand for 6 hours, during which time pyridine hydrochloride precipitated. The pyridine hydrochloride was removed by filtration and the resulting mixture was stripped at a temperature up to about 85° C. to remove the diethyl ether and any unreacted methylphenyldichlorosilane. The resulting solids were dissolved in hot toluene and some undissolved pyridine hydrochloride was removed by filtration. The toluene was then removed by evaporation. The solids were then recrystallized from n-heptane and then recrystallized twice more from an equal volume solution of cyclohexane and ethanol resulting in methylpentaphenylcyclotrisiloxane having the formula:

(5)

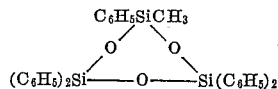

This material had a melting point of from 108 to 109.5° C. The identity of the compound was confirmed by infrared analysis which showed a doublet at 8.9 microns and a peak at 13.9 microns corresponding to the diphenylsiloxane units, a peak at 9.8 microns corresponding to the cyclotrisiloxane ring and peaks at 7.9 and 12.5 microns corresponding to the methylphenyl siloxy group. Chemical analysis showed the presence of 69.2% C, 5.43% H and 16.1% Si; as compared with the theoretical values of 69.9% C, 5.3% H and 15.8% Si.

EXAMPLE 2

The cyclopolysiloxane of Example 1 was converted to a diorganopolysiloxane gum by heating 7.5 parts of the cyclopolysiloxane to a temperature of about 120° C. under a pressure of about 10 microns to remove an entrained air or moisture and 0.1 part of 0.4% potassium hydroxide solution in octamethylcyclotetrasiloxane was added. Polymerization began within three minutes and the polymerization mixture was retained at a temperature of about 120° C. for a total of 15 minutes. At the end of this time, a firm, elastic, transparent gum was obtained. This gum was soluble in benzene and toluene. The infrared curve of this gum was the same as the curve for the starting cyclopolysiloxane except that the peak at 9.8 microns corresponding to the cyclotrisiloxane ring was missing, indicating that the resulting product consisted essentially of units having the formula:

(6) 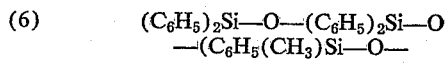

This gum had an intrinsic viscosity of 0.60 deciliter per gram in toluene at 30° C. and contained about 200 units of Formula 6, having a molecular weight of about 100,000.

EXAMPLE 3

A silicone rubber is prepared by milling one part of the gum of Example 2 with 0.4 part of silica aerogel and subjecting the resulting mixture to high energy electron irradiation to a dose of $100 \times 10^6$ Roentgens employing electrons having a peak voltage of 1,000,000 electron volts. This results in a strong, flexible silicone rubber which is particularly useful as a gasketing material for automotive transmissions.

EXAMPLE 4

To a solution of 80 parts pyridine in 700 parts ether were added a solution of 153 parts of hexaphenyltrisiloxanediol-1,5 in 400 parts diethyl ether and a solution of 47.7 parts of methylphenyldichlorosilane in 350 parts diethyl ether. After the addition was completed, the reaction mixture was allowed to stand for 16 hours during which time pyridine hydrochloride precipitated. The precipitate was filtered and the filtrate was stripped of ether solvent to yield a solid material. This solid material was dissolved in toluene and some insoluble material was filtered and the toluene was evaporated from the reaction mixture leaving a solid material. This solid was twice recrystallized from propanol to yield methylheptaphenylcyclotetrasiloxane having the formula:

(7)

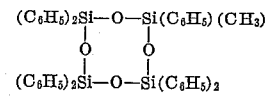

This material was a white crystalline powder having a melting point at 110 to 111° C. Its identity was confirmed by chemical analysis and infrared analysis. Chemical analysis showed the presence of 71.24% carbon, 5.41% hydrogen and 15.3% silicon as compared with the theoretical values of 70.6% carbon, 5.1% hydrogen and 15.3% silicon. Infrared analysis showed a doublet at 8.9 microns and a peak at 13.9 microns corresponding to the diphenylsiloxane units, peaks at 7.9 and 12.5 microns corresponding to the methylphenylsiloxy group and a peak at 9.3 microns corresponding to the cyclotetrasiloxane ring.

EXAMPLE 5

A polymer was prepared by heating 100 parts of the methylheptaphenylcyclotetrasiloxane prepared in Example 4 with 0.4 part of a 0.4% potassium hydroxide solution in octamethylcyclotetrasiloxane at a temperature of 145° C. for ½ hour. At the end of this time, the cyclopolysiloxane had been converted to a firm, transparent elastic gum which was soluble in benzene and toluene. The infrared curve of this gum was the same as the curve of the starting cyclotetrasiloxane except that the peak corresponding to the cyclotetrasiloxane ring was no longer present. This gum had an intrinsic viscosity of 0.46 deciliter per gram when measured in toluene at 30° C. This gum had a molecular weight of about 65,000 which corresponds to about 90 recurring units having the formula:

(8) 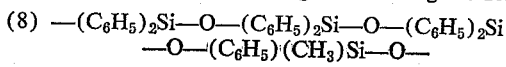

per molecule of the gum. This gum is converted to a silicone rubber by the procedure of Example 3.

EXAMPLE 6

A polymer is prepared by heating a mixture of 0.5 part of the methylheptaphenylcyclotetrasiloxane of Example 4 with 0.5 part of octaphenylcyclotetrasiloxane and heating the mixture to a temperature of 130° C. at a pressure of 15 microns. The molten mixture is maintained at a temperature of 120° C. under a nitrogen atmosphere while 0.01 part of a 0.6% potassium hydroxide solution in octamethylcyclotetrasiloxane is added with stirring. After about 15 minutes at temperature, the mixture polymerizes to a clear gum containing units derived from both the methylheptaphenylcyclotetrasiloxane and the octaphenylcyclotetrasiloxane. This gum is mixed with 0.4 part of diatomaceous earth and subjected to high energy electron bombardment to a dose of $150 \times 10^6$ Roentgens to produce a cross-linked filled silicone rubber.

What I claim as new and desire to secure by Letters Patent of the United States is:

1. The compound methylheptaphenylcyclotetrasiloxane.
2. A linear organopolysiloxane having a molecular weight of at least about 10,000 and consisting essentially of recurring units having the formula:

$$—(C_6H_5)_2Si—O—(C_6H_5)_2Si—O—(C_6H_5)_2Si—O—(C_6H_5)(CH_3)Si—O—$$

References Cited

UNITED STATES PATENTS

| | | | |
|---|---|---|---|
| 2,605,274 | 7/1952 | Tyler | 260—448.2 |
| 2,684,379 | 7/1954 | Guillissen et al. | 260—448.2 |
| 2,780,636 | 2/1957 | Wright et al. | 260—448.2 |
| 2,860,152 | 11/1958 | Fletcher | 260—448.2 |
| 2,868,766 | 1/1959 | Johannson | 260—448.2 |
| 2,954,391 | 9/1960 | Riley et al. | 260—448.2 |
| 2,994,684 | 8/1961 | Johannson | 260—448.2 |
| 3,105,061 | 9/1963 | Bruner | 260—448.2 |
| 3,122,579 | 2/1964 | Leitheiser | 260—448.2 |

OTHER REFERENCES

Eaborn, "Organosilicon Compounds," Academic Press, Inc., N.Y. publishers, 1960, page 237.

TOBIAS E. LEVOW, *Primary Examiner*

SAMUEL H. BLECH, *Examiner.*

P. D. FREEDMAN, J. G. LEVITT, P. F. SHAVER,
*Assistant Examiners.*